United States Patent [19]

Hüning et al.

[11] Patent Number: 5,061,408
[45] Date of Patent: Oct. 29, 1991

[54] APPARATUS FOR MASS TRANSFER BETWEEN A HOT GAS STREAM AND A LIQUID

[75] Inventors: Werner Hüning; Claus Gockel, both of Odenthal; Georg Richter, Apelern; Werner Biester, Hilden, all of Fed. Rep. of Germany

[73] Assignee: Bayer Aktiengesellschaft, Leverkusen, Fed. Rep. of Germany

[21] Appl. No.: 604,839

[22] Filed: Oct. 26, 1990

[30] Foreign Application Priority Data

Nov. 25, 1989 [DE] Fed. Rep. of Germany ....... 3939057

[51] Int. Cl.⁵ ............................................ B01D 47/06
[52] U.S. Cl. .................................. 261/112.1; 55/223; 55/235; 55/240; 261/116; 261/DIG. 54
[58] Field of Search ......................... 55/223, 235, 240; 261/112.1, 116, DIG. 54

[56] References Cited

U.S. PATENT DOCUMENTS

| | | | |
|---|---|---|---|
| 3,367,402 | 2/1968 | Cross et al. ........................ | 261/116 |
| 3,388,897 | 6/1988 | Calaceto ................ | 261/DIG. 54 X |
| 3,618,908 | 11/1971 | Stone ...................... | 261/DIG. 54 X |
| 3,704,570 | 12/1972 | Gardenier ...................... | 55/223 X |
| 3,793,809 | 2/1974 | Tomany et al. ......... | 261/DIG. 54 X |
| 4,206,159 | 6/1980 | Angelini et al. ........ | 261/DIG. 54 X |

Primary Examiner—Charles Hart
Attorney, Agent, or Firm—Sprung Horn Kramer & Woods

[57] ABSTRACT

The mass-transfer apparatus is based on the principle of the gas washer in which a liquid is injected into the hot gas stream. The apparatus consists essentially of a gas feed pipe (1), which discharges vertically into an injection chamber (2) of greater diameter. Connected to the injection chamber (2) is a mass-transfer duct (12) with a diffuser (13). The injection chamber (2) is closed at its upper end against the gas feed pipe (1) with an annular roof (4). In the annular roof (4) are arranged liquid nozzles (5), directed at an angle downwards. The gas feed pipe (1) does not terminate flush with the annular roof (4) but is extended into the injection chamber (2) in the form of a gas skirt tube (8), so that the liquid nozzles (5) in the annular roof (4) are protected from the hot gas stream.

6 Claims, 3 Drawing Sheets

APPARATUS FOR MASS TRANSFER BETWEEN A HOT GAS STREAM AND A LIQUID

BACKGROUND OF THE INVENTION

The invention relates to an apparatus for mass transfer between a hot gas stream and a liquid in which the liquid is sprayed into the hot gas stream. The apparatus consists in principle of a gas feed pipe, which discharges vertically into an injection chamber arranged coaxially with it, which is wider than the gas feed pipe and converges conically in the flow direction, the upper part of the injection chamber being formed by an annular roof joined to the gas feed pipe and having liquid nozzles inserted in it, and a heat- and mass- transfer duct connected coaxially to the injection chamber.

A similarly constructed apparatus, which enables industrial waste gases to be treated with a wash liquid, is known from DE-A 2 303 131. With such apparatuses it is also frequently sought to achieve, in addition to the adsorption of harmful substances and the retention of dust particles, the cooling of the gas stream.

In the treatment of hot gases, the transition zone from parts of the wall which are exposed to the dry hot gas to parts of the wall which are wetted or sprayed with liquid proves to be very exposed to corrosion. This critical disadvantage occurs to a particularly high degree if the wetting boundary, as a result of instabilities in the liquid jets or the gas flow or also through load changes in the flow of gas to be treated, shifts to and fro. Serious corrosion effects are also observed if cold liquid drops climb up the gas feed pipe and impinge on the tube's hot internal wall. At these points, owing to the thermal shock, a severe erosion of material occurs, which is also followed by corrosion phenomena.

Consequently the use of cheaper materials, such as rubberized steel, is excluded. Under the alternating thermal stress, even high-grade materials such as alloys of nickel, chromium and molybdenum, achieve fairly long on-stream times only when the corrosive constituents in the gas and in the liquid are of a relatively harmless nature.

As a result of the erosion and corrosion effects described, the on-stream time and consequently the availability of the mass-transfer apparatus is impaired. The invention is based on the problem of minimizing such corrosion phenomena by constructional measures relating to direction of the flow and by this means improving the on-stream times.

SUMMARY OF THE INVENTION

This problem is solved according to the invention, starting from the apparatus described initially for mass transfer between a hot gas stream and a liquid, by a gas skirt tube, as an extension of the gas feed pipe, projecting into the injection chamber, so that the liquid nozzles in the annular roof are protected against alternating thermal stresses. The injection chamber is consequently provided with an annular roof or cover which is not reached by the gas flow, since the skirt tube surrounds the hot gas stream. A further improvement of the on-stream time is achieved if the conically converging internal surface of the injection chamber is cooled by a liquid falling film which is produced by liquid inlets arranged near the largest diameter of the injection chamber.

It has been found that as a result of external backflow around the liquid jets issuing from the liquid nozzles, quite small liquid drops are borne upwards in large numbers, some of which impinge on the internal surface of the roof, which is thereby cooled. This cooling effect is particularly marked if the distance L between two neighbouring liquid nozzles is less than four times the width B of the annulus between the gas skirt tube and the wall region of greatest diameter of the injection chamber. With this dimensioning one can be sure that the whole internal surface of the roof is wetted with liquid. The additive protective effects from the screening by the skirt tube and from the wetting with liquid suffice to achieve long on-stream times, even if cheap and temperature-sensitive constructional materials, such as rubberized steel, are used for the whole internal surface of the injection chamber.

Advantageously, breakable joints are provided between the gas feed pipe and the roof of the injection chamber as well as between the roof and the conical section of the injection chamber, the bottom edge of the skirt tube being situated between the planes of these two breakable joints. Because of these measures, the skirt tube can, after slightly raising the gas feed pipe, be removed sideways from the complete apparatus in order for example to carry out repair or maintenance work.

The optimum length for operation of the gas skirt tube can suitably be adjusted by spacers.

With very hot gas streams, the temperature difference between the outside of the gas skirt tube and the temperature in the injection chamber can also be very large. The higher is this temperature difference, the more severely, according to experience, is the external surface of the gas skirt tube exposed to corrosion. In such cases it has proved useful, therefore, to avoid too high temperature differences by making the skirt tube with a double wall over its whole length or only in the lower section. The outer tube is then only moderately heated, so that the liquid which collects on the bottom edge concerned causes no serious corrosion. The inner tube, on the other hand, remains dry even at high temperatures and is for this reason largely protected from corrosion.

The advantages achieved with the invention are in the first place that the availability of the plant can be considerably improved because of the measures for avoiding or minimizing corrosion. At the same time, the constructional expenditure is relatively small. In addition possibilities arise, through the measures taken with regard to fluid flows, of using cheaper and more chemically resistant materials, which do not need to be high-temperature-resistant. In particular the sensitive liquid nozzles are displaced into a rearward zone which cannot be reached by the hot gas stream. Overall, a defined and reproducible direction of the flow of gas and liquid is achieved. By this a sharp demarcation, stationary in time, of the dry and wetted wall zones on the lower periphery of the skirt tube is guaranteed. The uncontrolled wetting of hot wall sections is practically eliminated. Because of that also the whole height of the apparatus from the bottom edge of the skirt tube is available for mass transfer.

It has also been found that through the installation of several nozzles in the annular roof a larger number of smaller drops and consequently improved mass transfer can be achieved. At the same time, through the arrangement of the nozzles and the skirt tube, undesirable oscillations of the gas column in the plant are damped.

In the following an embodiment of the invention is explained in more detail with the aid of drawings. Of these,

DETAILED DESCRIPTION OF THE INVENTION

Figure 1:
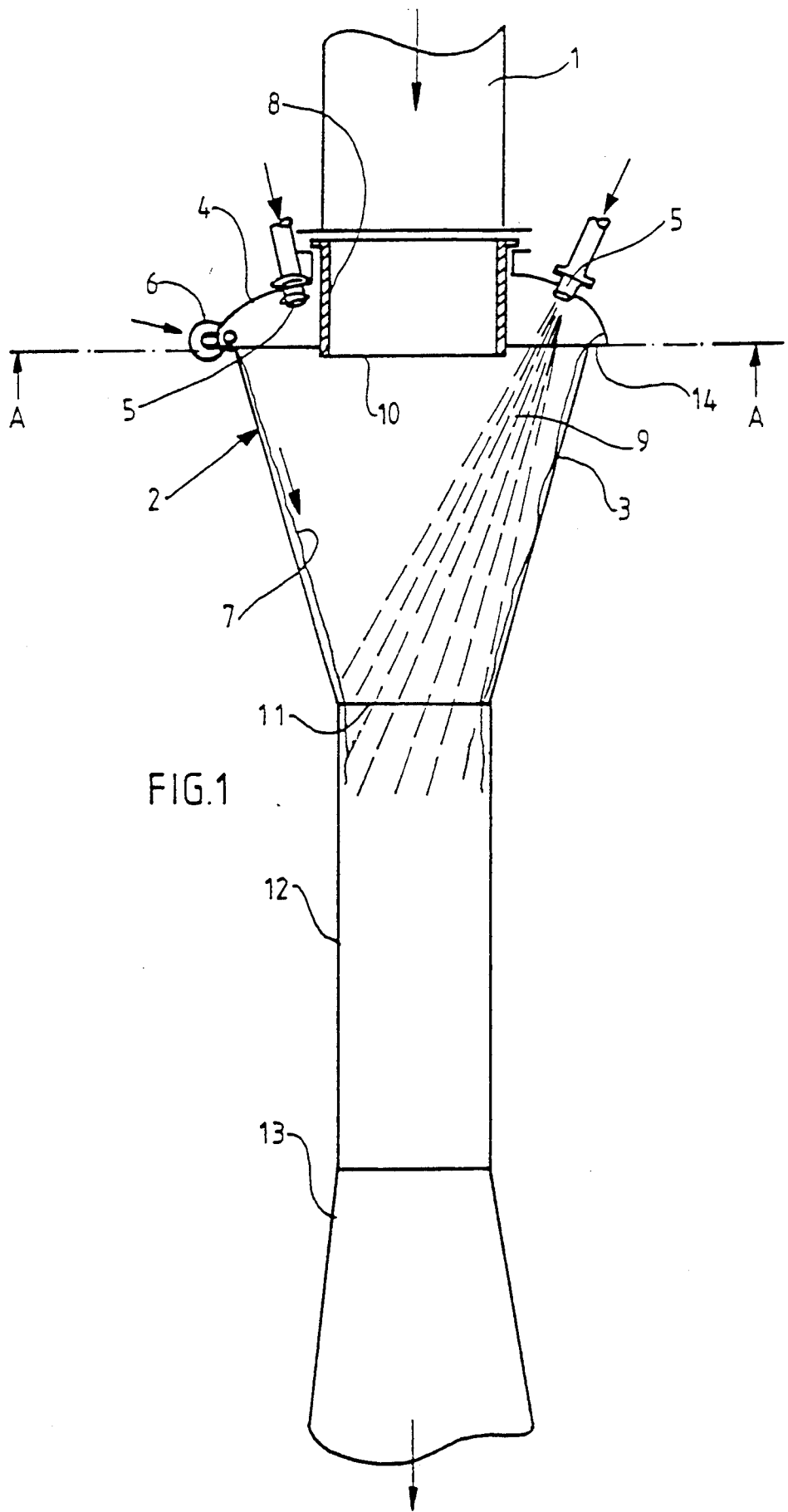
FIG. 1 shows a diagrammatic side view of the mass-transfer apparatus according to the invention with the gas feed pipe of the injection chamber and the mass-transfer duct.

With the hot-gas mass-transfer apparatus (high temperature quench) according to FIG. 1, a gas feed pipe 1 discharges vertically from above into an injection chamber 2. This has a considerably greater diameter at its upper end than the gas feed pipe 1, and consists of a section 3 converging conically in the flow direction and an arched roof 4, which is connected to the gas feed pipe 1. Inserted into the roof 4 and uniformly distributed over the circumference are several liquid nozzles 5, which are supplied via a common line, e.g. with wash liquid. Also provided, in the zone of greatest diameter of the conical section 2, are liquid inlets in the form of tangentially discharging pipes 6 (see also FIG. 2), which produce on the internal surface of the conical section 3 of the injection chamber 2 a uniform falling film of water 7, which ensures good cooling. The gas feed pipe 1 is extended at its lower end in the form of a gas skirt tube 8 into the injection chamber 2. By this means the liquid nozzles 5 and the greatest part of the roof surface are protected from the hot gas. The length of the skirt tube 8 and the angle of inclination of the nozzles 5 are so adapted to each other that the emerging divergent liquid jets 9 can still just pass the bottom edge 10 of the skirt tube 8. The spray cone angle of the nozzles 5 is such that each nozzle covers about the whole cross-sectional area 11 at the bottom and of the conical section 3. It is also guaranteed by this means that on failure (blockage) of one of the parallel-connected liquid nozzles 5 there is no noticeable impairment of function. A further advantage of this arrangement is that by the distribution of liquid over a number of nozzles, smaller liquid droplets and consequently a greater contact surface can be produced. Since the liquid nozzles 5 are protected and no longer project into the hot gas space, corrosion problems at the nozzle holders are largely eliminated. If necessary the internal surface of the annular roof 4 can be sprayed and cooled by means of additional nozzles (not shown).

To the cross-sectional area 11 at the bottom end of the injection chamber 2 is connected in known manner a cylindrical mass-transfer duct 12 with a following diffuser 13. The length of the complete mass-transfer duct 12 and 13 must normally be such that on the one hand the hot gas stream is cooled by the injection of washing or cooling liquid to the desired final temperature (saturation of the gas with water vapour with simultaneous cooling to the water vapour dewpoint), and on the other hand a sufficient preabsorption of the harmful substances, such as HCl, present in the flue gas can occur. It has been found, however, that because of the intensive mixing and the fineness of the drops the total length of the mass-transfer apparatus can be reduced.

Figure 2:
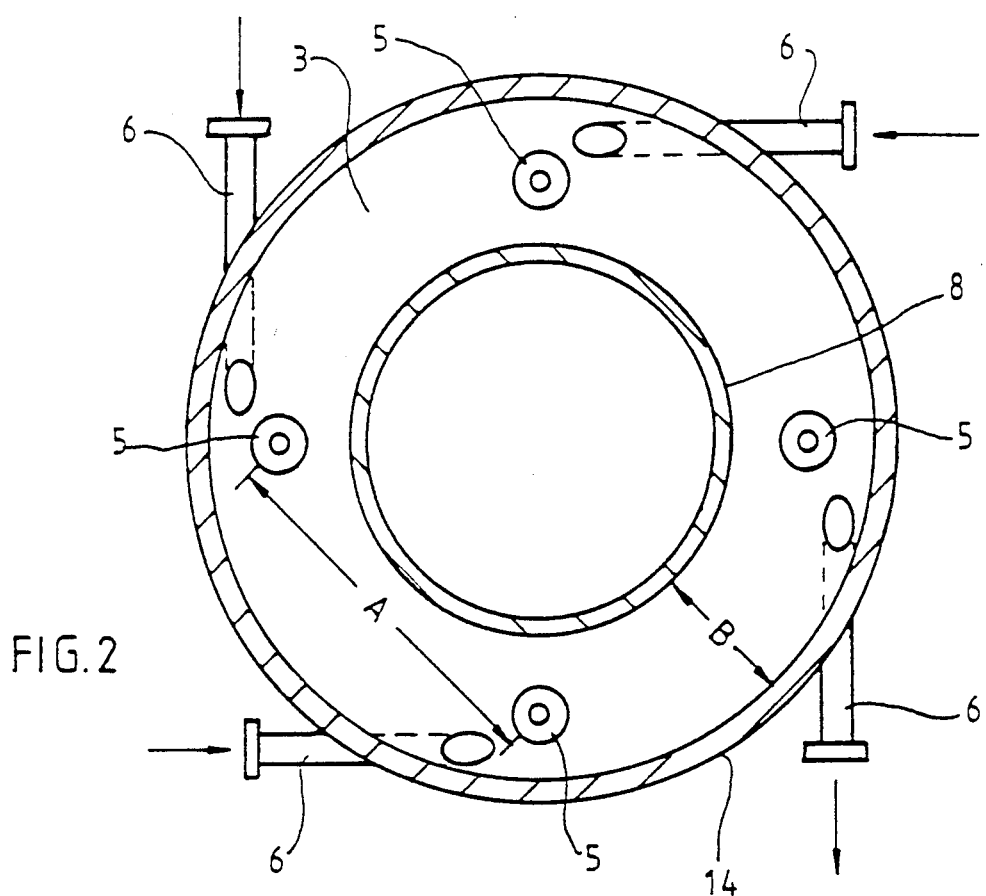
FIG. 2 shows a view of the annular roof or cover from below in the sectional plane A/A according to FIG. 1.

As shown in FIG. 2, the liquid inlets 6 are mounted tangentially at about the height of the wall zone 14 of greatest diameter of the injection chamber 2. As a result of the tangential introduction, the liquid falling film 7 acquires a spin component, so that a stable dynamic rotating falling film is formed.

Figure 3:
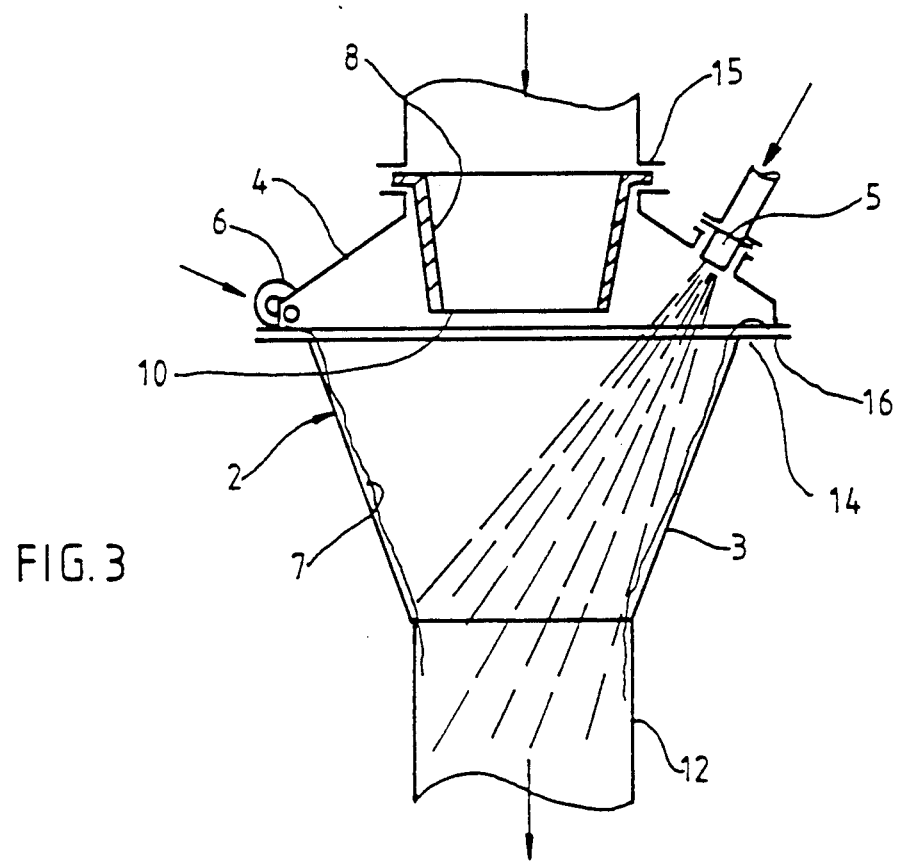
FIG. 3 shows a diagrammatic side view of an embodiment with an easily replaceable gas skirt tube.

In FIG. 2 four liquid nozzles 5 are also shown, whose separation A is chosen to be less than 4 times the width B of the annulus between the gas skirt tube 8 and the wall zone 14 of greatest diameter of the injection chamber. It has been found that with this dimensioning between two neighbouring nozzle jets, an upwardly-directed backflow develops, which conveys a sufficiently large fraction of fine drops to the internal surface of the roof 4 to keep the roof cool. With greater separations A, these backflows are only weakly developed, so that additional cooling by wetting the roof's internal surface may be necessary According to FIG. 3, the gas skirt tube 8 is mounted with a breakable joint 15 and the annular roof 4 with a breakable joint 16. The skirt tube 8 is also kept so short that its bottom edge 10 is above the breakable joint 16. This construction enables the roof 4 with the nozzles 5 and the liquid inlets 6 together with the skirt tube 8, after a small raising of the gas feed pipe 1, to be removed sideways from the complete apparatus in order, for example, to carry out repair or maintenance work. The breakable joints 15 and 16 are normal bolted flanges.

Figure 4:
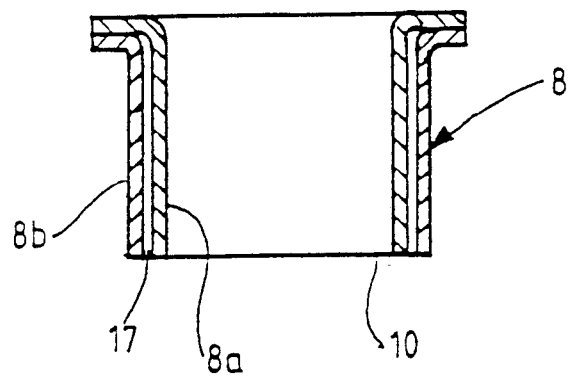
FIG. 4 shows a double-walled gas skirt tube.

According to FIG. 4, the skirt tube 8 is in double-walled form and consists of two concentric tubes 8a, 8b separated from each other by a gap 17.

Figure 5:
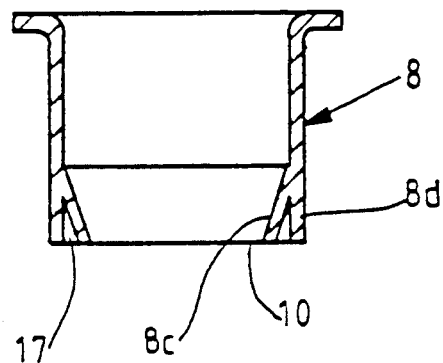
FIG. 5 shows a gas skirt tube, made double-walled in one section.

According to FIG. 5 only the lower zone, that is the outlet zone, of the skirt tube 8 is made double-walled. The corresponding tube sections (internal tube and external tube) are here designated 8c and 8d. With regard to corrosion problems, these double-walled versions represent a further improvement. Normally the skirt tube 8 is scarcely wetted on the outside. From experience, however near the bottom edge 10 some liquid collects, which then detaches as drops. At this point there is the boundary between the dry and wet surfaces. Since the skirt tube is not subject to any mechanical load, materials such as e.g. graphite, glass, even certain plastics, which are to a high degree corrosion resistant but have only a limited strength, can be used for this component. Since the skirt tube has only a protective function, a certain weight loss through corrosion in the lower zone at the outer and inner surfaces, as also at the bottom edge, can be accepted. If these corrosion phenomena, especially with high temperature applications, have to be eliminated or further reduced, however, the doublewalled versions of the skirt tube 8 according to FIGS. 4 and 5 must be preferred. Owing to the annular gap 17, the outer tube 8b or 8d heats up only moderately, so that the liquid which collects on the bottom edges of these tube sections does not cause important corrosion. On the other hand the inner tubes 8a and 8c respectively remain dry at high temperature and are therefore likewise only exposed to weak corrosive attack. If necessary a cooling medium can be introduced into the space between the two tubes 8a and 8b.

The apparatus described for mass transfer between a hot gas and a liquid is suitable in particular for treating hot exhaust gas streams from combustion plants. There is here a cooling of the exhaust gas stream, while simultaneously the harmful substances such as HCl contained in it are absorbed in the liquid and eliminated. Water is normally used as the liquid (wash liquid). The wash liquid can, however, also consist of a suitable reactive solution in order to achieve a deliberate elimination of specific harmful substances in the hot gas stream.

We claim:

1. An apparatus for mass transfer between a hot gas stream and a liquid injected into the hot gas stream, comprising: a gas feed pipe, a conical injection chamber coaxial with and having a greater diameter than the gas feed pipe and which converges in a flow direction, wherein the injection chamber has an upper end comprising an annular roof and a lower end having a cross-sectional area, means connecting the roof to the gas feed pipe, a plurality of spaced apart liquid nozzles inserted through the roof and disposed circumferentially thereround each for producing a conical spray, means mounting the nozzles on the roof with axes thereof at an acute angle with respect to the flow direction to direct the conical spray of each into the injection chamber such that the conical spray of each nozzle substantially covers the cross-sectional area of the lower end of the injection chamber, and a heat-and mass-transfer duct connected coaxially to a lower end of the injection chamber, wherein the means connecting the gas feed pipe to the roof comprises a gas skirt tube projecting through the roof and into the injection chamber to protect the liquid nozzles in the annular roof against the hot gas stream from the gas pipe and wherein a distance between two adjacent liquid nozzles is less than 4 times a width of an annulus between the skirt tube and a greatest diameter of the injection chamber.

2. The apparatus according to claim 1, further comprising means for producing a falling film of water on a conically converging internal surface of the injection chamber to cool same comprising liquid inlets arranged near a greatest diameter of the injection chamber.

3. The apparatus according to claim 1, wherein the means connecting the roof to the gas pipe comprises a breakable joint between the gas feed pipe and the roof of the injection chamber and further comprising means forming a breakable joint between the roof and the upper end of the injection chamber and wherein a bottom edge of the skirt tube is situated between the two breakable joints.

4. The apparatus according to claim 1, wherein the skirt tube comprises two concentric tubes separated by a gap.

5. The apparatus according to claim 1, wherein the skirt tube comprises a double-walled construction in a lower portion comprising an external length of tube and an internal length of tube.

6. The apparatus according to claim 1, further comprising spacers for adjusting the length of the skirt tube.

* * * * *